US010496897B2

(12) United States Patent
Huang et al.

(10) Patent No.: US 10,496,897 B2
(45) Date of Patent: Dec. 3, 2019

(54) METHOD AND APPARATUS FOR RECOGNIZING RGB-D OBJECTS BASED ON ADAPTIVE SIMILARITY MEASURE OF DENSE MATCHING ITEM

(71) Applicant: Institute of Automation Chinese Academy of Sciences, Beijing (CN)

(72) Inventors: Kaiqi Huang, Beijing (CN); Xin Zhao, Beijing (CN); Yanhua Cheng, Beijing (CN)

(73) Assignee: Institute of Automation Chinese Academy of Sciences, Beijing (CN)

( * ) Notice: Subject to any disclaimer, the term of this patent is extended or adjusted under 35 U.S.C. 154(b) by 0 days.

(21) Appl. No.: 15/746,568

(22) PCT Filed: Nov. 25, 2015

(86) PCT No.: PCT/CN2015/095552
§ 371 (c)(1),
(2) Date: Jan. 22, 2018

(87) PCT Pub. No.: WO2017/088125
PCT Pub. Date: Jun. 1, 2017

(65) Prior Publication Data
US 2018/0268251 A1 Sep. 20, 2018

(51) Int. Cl.
*G06K 9/62* (2006.01)
*G06K 9/46* (2006.01)

(52) U.S. Cl.
CPC ......... *G06K 9/6215* (2013.01); *G06K 9/4652* (2013.01); *G06K 9/627* (2013.01)

(58) Field of Classification Search
CPC ...... G06K 9/4652; G06K 9/6215; G06K 9/62; G06K 9/627; G06N 3/02
See application file for complete search history.

(56) References Cited

U.S. PATENT DOCUMENTS

2018/0046649 A1* 2/2018 Dal Mutto ............... G06N 3/02

FOREIGN PATENT DOCUMENTS

| CN | 104599275 A | 5/2015 |
|---|---|---|
| CN | 104679863 A | 6/2015 |

(Continued)

OTHER PUBLICATIONS

PCT/CN2015/095552 Search Report.
(Continued)

*Primary Examiner* — Ruiping Li
(74) *Attorney, Agent, or Firm* — Maier & Maier, PLLC

(57) ABSTRACT

The application discloses a method and an apparatus for recognizing RGB-D objects based on adaptive similarity measure of dense matching item, wherein the method can include at least the following steps: convolution neural network features of a to-be-queried object and a reference object are extracted; dense matching is carried out on the reference object and the to-be-queried object on the basis of the convolution neural network features fused with RGB and depth information; similarity between the reference object and the to-be-queried object is measured according to a dense matching result; and the to-be-queried object is classified based on the similarity between the reference object and the to-be-queried object. With the embodiments of the present application, at least in part, the technical problem of how to improve the robustness of object recognition is solved.

6 Claims, 4 Drawing Sheets

(56) References Cited

FOREIGN PATENT DOCUMENTS

| | | |
|---|---|---|
| CN | 104850825 A | 8/2015 |
| CN | 105512674 A | 4/2016 |

OTHER PUBLICATIONS

Schwarz, M. et al., "RGB-D Object Recognition and Pose Estimation Based on Pre-trained Convolutional Neural Network Features", IEEE International Conference on Robotics and Automation (ICRA), (May 30, 2015) ISSN 1050-4729 *, chapters I, III and IV *.

* cited by examiner

METHOD AND APPARATUS FOR RECOGNIZING RGB-D OBJECTS BASED ON ADAPTIVE SIMILARITY MEASURE OF DENSE MATCHING ITEM

TECHNICAL FIELD

The embodiments of the present application relate to the field of pattern recognition, machine learning and computer vision technology, and in particular to a method and apparatus for recognizing RGB-D object based on adaptive similarity measure of dense matching item.

BACKGROUND

With the rapid increase in computer computing power, computer vision, artificial intelligence, machine perception and other fields have also developed rapidly. Image classification, as one of the basic problems in computer vision, has also been developed by leaps and bounds. Image classification is the use of computer intelligence analysis of an image, and then the determination of the category of the image. Conventional image classification algorithms usually rely on RGB images to recognize objects merely. They are easily affected by light changes, object colour changes and background noisy interference. They are not robust in practical application, and their accuracy is very difficult to meet user requirements as well.

The development of depth sensing technology, such as Microsoft's Kinect, can capture the depth picture with high-precision, which is well to make up for the above-mentioned shortcomings of the traditional RGB picture, and which provides possibility for high accuracy object recognition with good robustness. In the field of computer vision and robotics, there are a lot of researches to explore how to effectively use RGB and depth information to improve the accuracy of object recognition. Basically, these algorithms can be summarized as the three major aspects of pattern recognition: pattern (feature) expression, similarity measure and classifier design. Because the present feature expression method is basically independent of the input and cannot adapt to all scales, angles and postures of the object in the input picture automatically, the robustness of object recognition is poor.

In view of the above, the present application has been proposed.

SUMMARY

The main object of the embodiments of the present application is to provide a method and an apparatus for recognizing RGB-D objects based on adaptive similarity measure of dense matching item, which at least partially solves the technical problem of how to improve the robustness for object recognition.

To achieve the above object, according to one aspect of the present application, it provides the following technical solution:

A method for recognizing RGB-D objects based on adaptive similarity measure of dense matching item, comprising at least:

convolution neural network features of a to-be-queried object and a reference object are extracted;

dense matching is carried out on the reference object and the to-be-queried object on the basis of the convolution neural network features in fusion with RGB and depth information;

similarity between the reference object and the to-be-queried object is measured according to a result of the dense matching; and the to-be-queried object is classified based on the similarity between the reference object and the to-be-queried object.

Furthermore, the following formula is used for dense matching of the reference object and the to-be-queried object:

$$E(t_i) = \sum_i D_i(t_i) + \alpha \sum_i \|t_i\|_1 + \beta \sum_{i,j \in N} \min(\|t_i - t_j\|_1, \lambda); \text{ wherein } \sum_i D_i(t_i)$$

represents a data term;

$$\alpha \sum_i \|t_i\|_1$$

represents a displacement term;

$$\beta \sum_{i,j \in N} \min(\|t_i - t_j\|_1, \lambda)$$

represents a smoothing term; $t_i$ represents the amount of displacement of a pixel point found in the reference object corresponding to the i-th pixel point of the to-be-queried object; $t_j$ represents the amount of displacement of a pixel point found in the reference object corresponding to the j-th pixel point of the to-be-queried object; $D_i(t_i)$ represents a difference between the convolution neural network features of two matched pixel points; $\lambda$ represents a threshold value which defines a structure relationship of adjacent pixel points in the to-be-queried object; $\alpha$ and $\beta$ represent the weight coefficients among the data term, the displacement term, and the smoothing term.

Furthermore, the data terms specifically include:

$$D_i(t_i) = \theta \cdot [f_{rgb}(p_i \mid I_r) - f_{rgb}(p_i + t_i \mid I_q)] + (1 - \theta) \cdot [f_{depth}(p_i \mid I_r) - f_{depth}(p_i + t_i \mid I_q)];$$

wherein $f_{rgb}(p_i|I_q)$, $f_{rgb}(p_i|I_r)$ refer to the convolution neural network features at the i-th pixel point in the RGB images of the to-be-queried object and the reference object respectively; $f_{depth}(p_i|I_q)$, $f_{depth}(p_i|I_r)$ refer to extracted depth features; $\theta$ refers to a fusion coefficient of RGB and depth information.

Furthermore, the measure of the reference object and the to-be-queried object includes: use of the following formula to measure the similarity between the reference object and the to-be-queried object:

$$s_\theta(I_r \mid I_q) = \exp\left(-\gamma^{-1} \sum_i D_i(t_i)\right);$$

wherein $\gamma$ represents a scale factor; $s_\theta(I_r/I_q)$ indicates a similarity score between the reference object and the to-be-queried object.

Furthermore, said use of the following formula to measure the similarity between the reference object and the to-be-queried object further includes:

$$s_{sum}(I_r \mid I_q) = \sum_{\theta} w_{\theta} \times s_{\theta}(I_r \mid I_q) + b = w^{\bullet}\Phi_{I_r \mid I_q};$$

wherein $s_{\theta}$ refers to the corresponding similarity score, $w_{\theta}$ refers to a weight coefficient, b refers to a deviation factor of the fusion; w refers to the weight vector of the fusion; and $\Phi$ refers to a score vector of the fusion.

Furthermore, said w is solved by ranking SVM algorithm and by using the following formula:

$$\min \tfrac{1}{2}\|w\|_2^2 + C\Sigma\xi_{i,i^+,i^-}$$

$$s.t. \forall (I_i, I_i^+, I_i^-) \in \Omega, \xi_{i,i^+,i^-} \geq 0,$$

$$w\Phi_{I_i^{-1}I_i^-} - w\Phi_{I_i^{-1}I_i^-} > 1 - \xi_{i,i^+,i^-}$$

$$\forall c(I_i) = c(I_i^+), c(I_i^-) \neq c(I_i),$$

wherein $\Omega = \{(I_i, I_i^+, I_i^-)\}_{i=1}^N$ represents a triple database; $I_i$ represents the to-be-queried object; $I_i^+$ denotes the reference object of the same category as the to-be-queried object; $I_i^-$ denotes the reference object of a different category from the to-be-queried object; $\xi$ denotes a slack variable; C represents a penalty parameter.

Furthermore, classification of the to-be-queried object includes: use the following formula to classify the to-be-queried object:

$$s_{vote}(I_t; c_i) = \frac{1}{K} \sum_{I_r \in c_i} s_{sum}(I_r \mid I_t),$$

wherein $I_t$ represents the to-be-queried object; $c_i$ represents categories of retrieved candidate classes; K represents the number of the reference object in the candidate class.

According to another aspect of the present application, it is provided an apparatus for recognizing RGB-D objects based on adaptive similarity measure of dense matching item, the apparatus comprising at least:
A feature extraction module for extracting convolution neural network features of a to-be-queried object and a reference object;
a dense matching module for carrying out dense matching of the reference object and the to-be-queried object on the basis of the convolution neural network features in fusion with RGB and depth information;
a similarity measure module for measuring the similarity between the reference object and the to-be-queried object according to a result of the dense matching; and
a classification module for classifying the to-be-queried objects based on the similarity between the reference object and the to-be-queried object.

Compared with the prior art, the above technical solutions at least have the following advantageous effects:

According to the embodiments of the present application, the convolution neural network features are fused with RGB and depth information to perform dense matching of the reference object and the to-be-queried object, and then the similarity between the reference object and the to-be-queried object is measured according to the dense matching result; and at last the to-be-queried objects are classified based on the similarity. In this way, it is possible to make good use of complementarity of RGB and depth so as to increase the robustness of object recognition.

Of course, it is unnecessary to require any one of the products of the present application to achieve all of the advantages described above.

Other features and advantages of the present application will be set forth in the following description, and in part will become apparent from the description, or be learned by implementation of the present application. The objects and other advantages of the present application can be realized and obtained by means of methods particularly pointed out in the description, claims, and accompanying drawings.

It should be noted that the summary of the application is not intended to identify essential technical features of the claimed subject matter, and it is not used to determine the scope of protection of the claimed subject matter either. The claimed subject matter is not limited to solve any or all disadvantages mentioned in the Background Art.

BRIEF DESCRIPTION OF DRAWINGS

The drawings, as part of the present application, are used to provide a further understanding of the present application. Exemplary embodiments of the present application and the illustration for the same are used to explain the present application, but do not constitute an undue limitation to the present application. Obviously, the drawings in the following description are only some embodiments; a person skilled in the art could also obtain other drawings according to the above said drawings without creative efforts. In the drawings.

The drawings and text description are not intended to limit the scope of spirit of the present application in any way, instead, describe the concept of the present application with reference to specific embodiments for a person skilled in the art.

DESCRIPTION OF EMBODIMENTS

The technical problem solved by the embodiments of the present application, the adopted technical solutions and the achieved technical effect will be described below clearly and completely with reference to the figures and embodiments. Obviously, the described embodiments are merely part of the embodiments of the present application, not all embodiments. All other equivalent embodiments or obvious variations that are obtained by a person skilled in the art based on the embodiments of the present application without any creative efforts fall within the scope of the present application. The embodiments of the present application can be specified in many different ways defined and covered in claims.

Furthermore, it is to explain that for ease of understanding, numerous specific details are given in the following description. But it is apparent that implementation of the present application may be practiced without these specific details.

It is to note that, in the absence of clear definition or conflict, the respective embodiments of the present application and the technical features of the embodiments can be combined with each other to form technical solutions.

The main idea of the embodiments of the present application is to realize self-adaptation of the scales, the viewing angles, the postures of the to-be-queried object by use of dense matching so as to retrieve objects in the database with increased robustness, as well as to design various types of dense matching items to combine RGB and depth information effectively to realize highly accurate object recognition.

Figure 1:
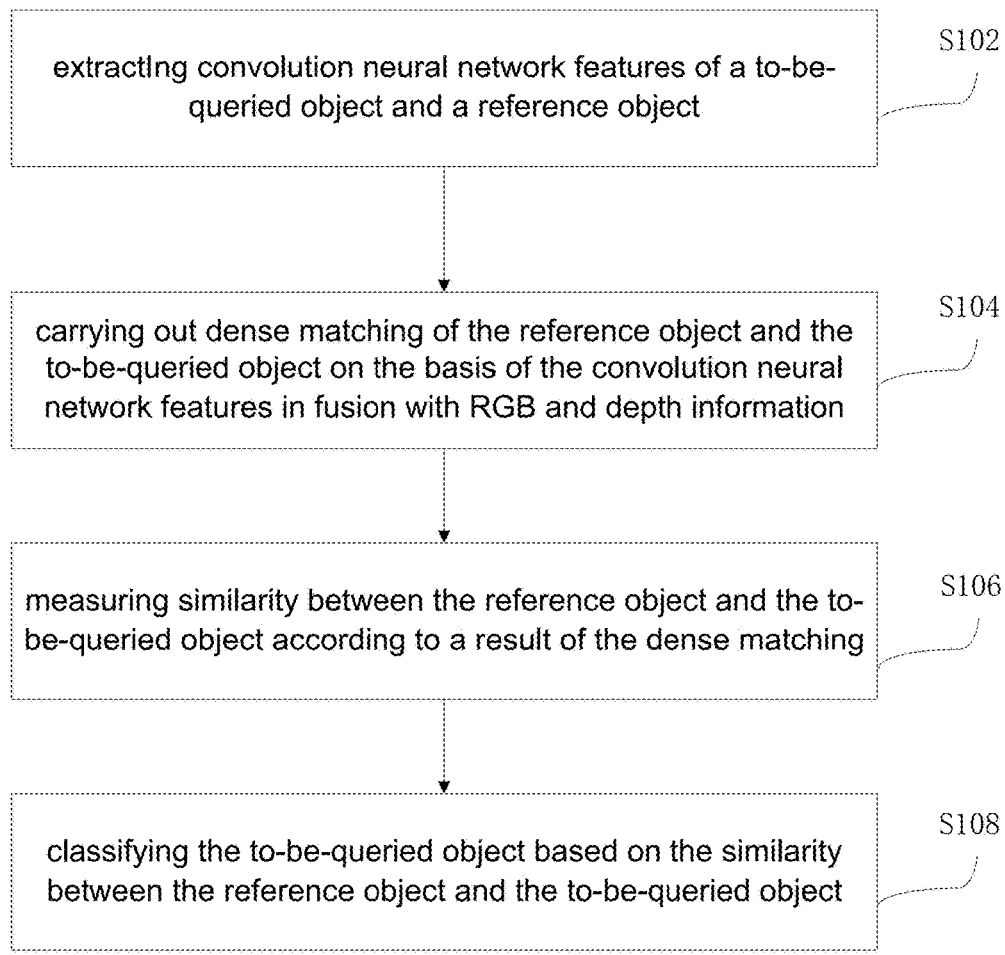
FIG. 1 is a flow chart illustrating a method for recognizing RGB-D objects based on adaptive similarity measure of dense matching item in accordance with an exemplary embodiment.

FIG. 1 shows a flow chart illustrating a method for recognizing RGB-D objects based on adaptive similarity measure of dense matching item in accordance with an exemplary embodiment. As shown in FIG. 1, the method may comprise at least the step S102 to the step S108.

Step S102: extract convolution neural network features of a to-be-queried object and a reference object.

In this step, a convolution neural network feature is a three-dimensional matrix of features. To express each pixel point by means of convolution neural network feature is better than to express each pixel point purely by means of pixel value in terms of expressive power. Preferably, each pixel point is expressed by use of unsupervised convolution neural network feature. Convolution neural network feature is used to capture more robust shallow features (for example, edge information) as well as mid-level features (such as object component information) of the object, so as to better express the object.

Step S104: carry out dense matching on the reference object and the to-be-queried object on the basis of the convolution neural network features in fusion with RGB and depth information.

In this step, dense matching aims to enable the reference object to be deformed according to the to-be-queried object, so that they have similar scale, view angle and posture. In substance, dense matching aims to find a mapping relationship from the reference object to the to-be-queried object.

For example, the following definition is made: $I_q$ represents a to-be-queried object, $I_r$ represents a reference object, $p_i=(x, y)$ represents a pixel point of the reference object $I_r$, $p_i'=(x',y')$ represents the pixel point in the to-be-queried object $I_q$ which matches with the $p_i$, if $t_i=(d_x, d_y)$ denotes the amount of displacement, then it is possible to find for each pixel of $I_r$ a corresponding matching pixel in $I_q$, namely:

$$(x',y')=(x,y)+(d_x,d_y) \quad (1)$$

In an alternative embodiment, in order to perform dense matching of the reference object and the to-be-queried object, a graph matching method in optical flow is used for reference to define an energy function $E(t_i)$ including an data term $$\sum_i D_i(t_i),$$

a displacement term $$\alpha \sum_i \|t_i\|_1$$

and a smoothing term $$\beta \sum_{i,j \in N} \min(\|t_i - t_j\|_1, \lambda)$$

by combining RGB and depth information:

$$E(t_i) = \sum_i D_i(t_i) + \alpha \sum_i \|t_i\|_1 + \beta \sum_{i,j \in N} \min(\|t_i - t_j\|_1, \lambda), \quad (2)$$

wherein $t_i$ represents the amount of displacement of a pixel point found in the reference object corresponding to the i-th pixel point of the to-be-queried object; $t_j$ represents the amount of displacement of a pixel point found in the reference object corresponding to the j-th pixel point of the to-be-queried object; $D_i(t_i)$ represents a difference in convolution neural network features of two matched pixel points; $\lambda$ represents a threshold value which defines the structure relationship of the adjacent pixel points in the to-be-queried object; $\alpha$ and $\beta$ represent the weight coefficient among the data term, the displacement term, and the smoothing term.

Those skilled in the art should be able to understand: The above definition is only used to illustrate embodiments of the present application better and shall not be deemed as improper limitation of the scope of protection of the present application.

It is possible to find the most similar pixel point in $I_r$ for each pixel point in $I_q$ by minimizing the energy function in the formula (2), and it is ensured that the found similar points in $I_r$ for the adjacent pixel points in $I_q$ are also adjacent. In this way it is possible to find corresponding point in $I_r$ for each point in $I_q$, namely the mapping relationship M: $I_r \rightarrow I_q$ can be obtained.

Next, each term in the formula (2) is explained as follows:
Data term $$\sum_i D_i(t_i)$$

is used to measure the difference in terms of RGB and depth features of the two objects, i.e., the reference object and the to-be-queried object. Compared with traditional data term of optical flow, the data term in the embodiment of the present application contains the RGB and depth information.

In an alternative embodiment, $$D_i(t_i) = \theta \cdot [f_{rgb}(p_i | I_r) - f_{rgb}(p_i + t_i | I_q)] + \quad (3)$$
$$(1 - \theta) \cdot [f_{depth}(p_i | I_r) - f_{depth}(p_i + t_i | I_q)],$$

wherein $f_{rgb}(p_i|I_q)$, $f_{rgb}(p_i|I_r)$ refer to the convolution neural network features at the i-th pixel point in the RGB images of the to-be-queried object and the reference object respectively; $f_{depth}(p_i|I_q)$, $f_{depth}(p_i|I_r)$ refer to the extracted depth features; $\theta$ refers to the fusion coefficient of RGB and depth information.

The displacement term $$\alpha \sum_i \|t_i\|_1$$

is an L1 norm and is used for penalty for the unexpected large deformation.

The smoothing term $$\beta \sum_{i,j \in N} \min(\|t_i - t_j\|_1, \lambda)$$

is used to ensure that the displacement of the adjacent pixels has similarity, so as to ensure the similarity of the local structure of the object.

In practical application, it can ensure the similarity matching of the local structure of the object by minimizing the energy function $E(t_i)$, namely by making the matching relationship between the to-be-queried object and the reference object satisfy the following conditions: a. the pixel points having similar appearance feature are matched together as far as possible (it is controlled by the data term); b. the matched pixel points do not have large displacement, namely it is so limited that there is no large deformation of objects (it is controlled by the displacement term); c. the found matching points in the reference object corresponding to the adjacent local pixel points in the to-be-queried object are also adjacent (it is controlled by the smoothing term).

After dense matching, the reference object can be adaptive to the scale, view angle and posture of the to-be-queried object.

Step S106: similarity between the reference object and the to-be-queried object is measured according to the dense matching result.

In an alternative embodiment, in order to identify the object, the energy function obtained by the formula (2) is quantized into a similarity score, namely:

$$s_\theta(I_r | I_q) = \exp\left(-\gamma^{-1} \sum_i D_i(t_i)\right), \quad (4)$$

wherein $\gamma$ represents the scale factor; $D_i(t_i)$ represents the difference between the convolution neural network features of two matched pixel points; $s_\theta(I_r|I_q)$ indicates the similarity score between the reference object and the to-be-queried object.

Figure 4:
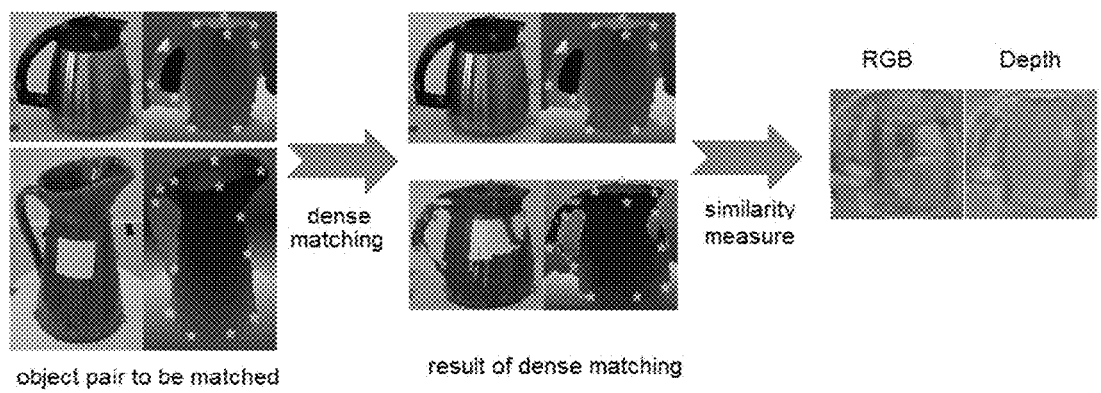
FIG. 4 schematically shows a similarity measure based on dense matching in accordance with an exemplary embodiment.

FIG. 4 schematically shows a similarity measure based on dense matching in accordance with an exemplary embodiment and also shows the result of the dense matching of the to-be-matched object pair as well as the result of the similarity measure according to said result of the dense matching. It can be learned from the figure the RGB image and depth image after the similarity measure.

As the dense matching may lead to an error matching and cause an error, so a robust estimation method is used for estimating $\gamma$. That is: the top 5% of energy matching values having the maximum error are not used and the average value of the remained is found as $\gamma$. This strategy has great noise robustness. The physical meaning of the similarity score is: after the object matching (formula (2)), the two objects are consistent in the aspects of scale, view angle and posture. Thus, the similarity relationship between the two objects can be measured very well by measuring the similarity score between the two (formula (4)). The higher the similarity score is, the higher the possibility is that the category of the to-be-queried object is the same as that of the reference object.

There is no perfect fusion ratio that can adapt to all categories or any category. This is because different categories have different degrees of dependence on appearance (RGB) and spatial geometry (depth); furthermore, even for one and the same category, due to the intra-category difference and view angle difference, its dependency on appearance and spatial geometry may change as well.

This requires to design a group of dense matching items corresponding to different fusion ratios and to fuse all matching items by a learning method; this is called learning-fusion strategy. This learning-fusion strategy aims to fuse all the matching items to obtain a final score.

In an alternative embodiment, it is assumed a group of $\theta \in [0,1]$ resulting in a set of similarity scores $s_\theta$, all matching items are fused to obtain a final similarity score:

$$s_{sum}(I_r | I_q) = \sum_\theta w_\theta \times s_\theta(I_r | I_q) + b = w^\bullet \Phi_{I_r|I_q}. \quad (5)$$

For any fusion coefficient $\theta$, $s_\theta$ refers to the similarity score corresponding to said fusion coefficient, $w_\theta$ refers to the weight coefficient, b refers to the deviation factor of fusion. The linear superposition is written in form of vector dot product, wherein $w=[s_{\theta_1}, w_{\theta_2}, \ldots, w_{\theta_N}, b]$, $\Phi=[s_{\theta_1}, s_{\theta_2}, \ldots, s_{\theta_N}, 1]$, w refers to the weight vector of the fusion and $\Phi$ refers to the score vector of the fusion.

Those skilled in the art could understand, the above assumption only aims to explain the present application better and shall not be deemed as improper limitation to the present application.

The physical meaning of the formula (5) is: Given a to-be-queried object $I_q$ and a reference object $I_r$, different fusion parameters $\theta$ are used in the embodiments of the present application to obtain different matching relationships (i.e., matching items) when the similarity between the to-be-queried object and the reference object is measured. A similarity score $s_\theta$ can be obtained for each matching item through the formula (4). The strategy based on learning-fusion is to study the effective fusion of all similarity scores to obtain a final score and to measure the final similarity relationship between the objects by use of said final score.

The purpose of w learning process is $s_{sum}(I_q^+|I_q) > s_{sum}(I_q^-|I_q)$, wherein $I_q^+$ and $I_q$ are from the same category and $I_q^-$ is from a different category.

The learning aims to make the similarity of samples of the same category higher than the similarity of samples from different categories.

In order to obtain an optimum w, ranking SVM algorithm is used in an alternative embodiment, wherein its objective function is:

$$\min \tfrac{1}{2}\|w\|_2^2 + C\Sigma \xi_{i,i^+,i^-}$$

$$s.t. \forall (I_i, I_i^+, I_i^-) \in \Omega, \xi_{i,i^+,i^-} \geq 0,$$

$$w\Phi_{I_i^{-1}I_i^+} - w\Phi_{I_i^{-1}I_i^-} > 1 - \xi_{i,i^+,i^-}$$

$$\forall c(I_i) = c(I_i^+), c(I_i^-) \neq c(I_i) \quad (6)$$

wherein $w=[w_{\theta_1}, w_{\theta_2}, \ldots, w_{\theta_b}, b]$ here represents the to-be-optimized fusion weight vector, $\Phi=[s_{\theta_1}, s_{\theta_2}, \ldots, s_{\theta_N}, 1]$ represents the fused score vector; $w=[w_{\theta_1}, w_{\theta_2}, \ldots, w_{\theta_N}, b]$ $\Omega=\{(I_i, I_i^+, I_i^+)\}_{i=1}^N$ represents a triple database; $I_i$ represents a to-be-queried object; $I_i^+$ denotes the reference object of the same category as the to-be-queried object; $I_i^-$ denotes the reference object of a different category from the to-be-queried object; $\xi$ denotes the slack variable; C represents the penalty parameter.

In order to optimize this objective function, it is required to configure such a triple database $\Omega=\{(I_i, I_i^+, I_i^+)\}_{i=1}^N$ in advance, in which database it can be found for each to-be-queried object $I_i$, a reference object $I_i^+$ of the same category as said to-be-queried object, as well as a reference object $I_i^-$ of a different category from said to-be-queried object, thereby $I_i$, $I_i^+$ and $I_i^-$ form a triple group. The database $\Omega$ consists of a plurality of these triple groups.

The purpose of optimizing the formula (6) by use of ranking SVM algorithm is to fuse the weight vectors w so as to guarantee that the similarity score of objects of the same category is higher than the similarity score of objects of different categories. This improves the accuracy of object recognition of top-1.

Step S108: classify the to-be-queried object based on the similarity between the reference object and the to-be-queried object.

In an alternative embodiment, a to-be-queried object $I_t$ is given, the closest T candidate categories are retrieved by using the feature-based methods, and K reference objects are chosen from each of the candidate categories, then the vote value for dividing the objects $I_t$ into category $c_i$ is:

$$s_{vote}(I_t; c_i) = \frac{1}{K}\sum_{I_r \in c_i} s_{sum}(I_r | I_t), \quad (7)$$

wherein $c_i$ refers to the category of the retrieved candidate categories.

The vote value refers to the mean of similarity scores of each to-be-queried object to all reference objects in the candidate category and is the measure of the similarity relationship of the to-be-queried object and the candidate category; for maximum vote value, the category of the candidate category is the same as the category of the to-be-queried object, namely the category of $I_t$ depends upon the size of the vote value.

Figure 5A:
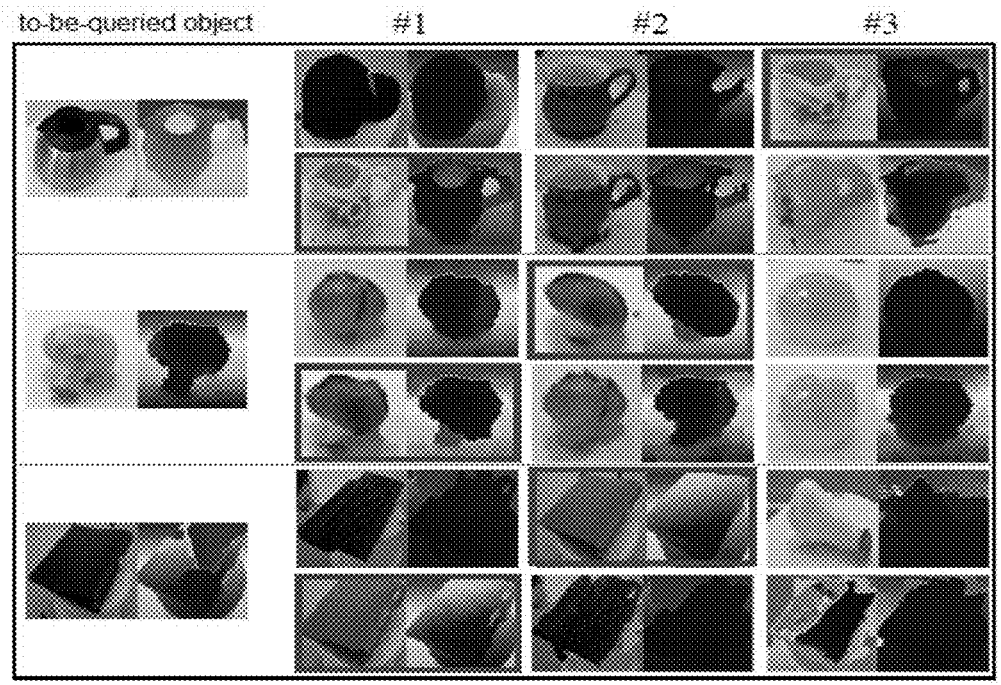
FIG. 5a schematically shows reordering based on dense matching in accordance with an exemplary embodiment.
Figure 5B:
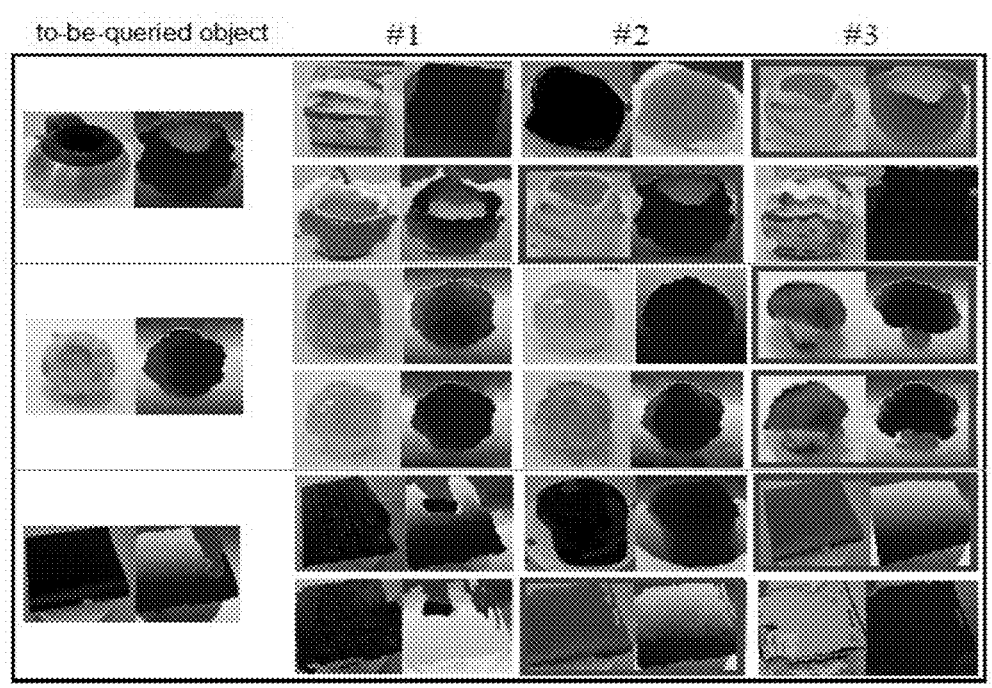
FIG. 5b schematically shows reordering based on dense matching in accordance with another exemplary embodiment.

This classification is based on the reordering. FIG. 5a schematically shows reordering based on dense matching in accordance with an exemplary embodiment; FIG. 5b schematically shows reordering based on dense matching in accordance with another exemplary embodiment. For each to-be-queried object, the first line shows the top-3 retrieve results of the best traditional method, the second line shows the retrieve results of the method according to the embodiments of the present application, wherein FIG. 5a shows that the method according to the embodiment of the present application is able to arrange the objects of the same category at the #1 position very well; FIG. 5b shows: Although neither the method according to the embodiment of the present application nor the traditional method can arrange the objects of the same category at the #1 position correctly, the method according to the embodiment of the present application is able to arrange the objects of the same category at the position ahead very well, that is, it shows that the method according to the embodiment of the present application can still provide a more reasonable result. Therefore, the precision of object identification is improved by the reordering methods.

Figure 2:
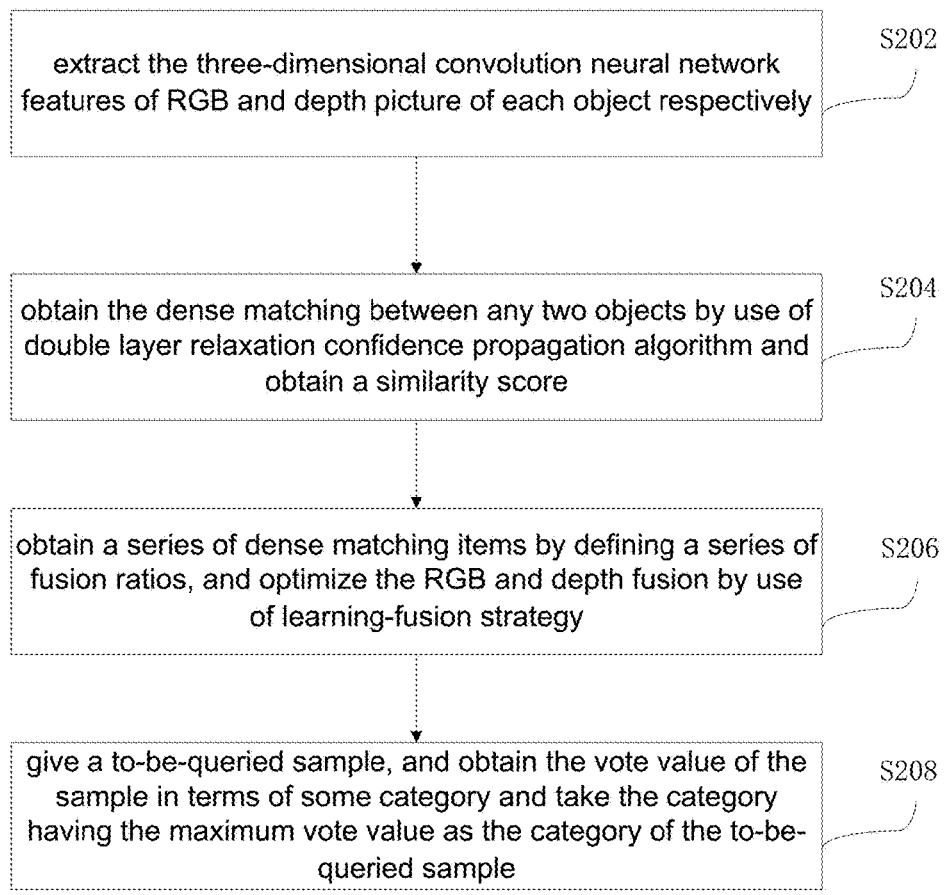
FIG. 2 is a flow chart illustrating a method for recognizing RGB-D objects based on adaptive similarity measure of dense matching item in accordance with another exemplary embodiment.

A preferred embodiment is provided below to better illustrate the present application. As shown in FIG. 2, the method may comprises:

Step S202: extract the three-dimensional convolution neural network features of RGB and depth picture of each object respectively.

Step S204: obtain the dense matching between any two objects by use of double layer relaxation confidence propagation algorithm and obtain a similarity score.

Step S206: obtain a series of dense matching items by defining a series of fusion ratios, and optimize the RGB and depth fusion by use of learning-fusion strategy.

Step S208: give a to-be-queried sample, and obtain the vote value of the sample in terms of some category according to formula (7) and take the category having the maximum vote value as the category of the to-be-queried sample.

Respective steps in the above embodiment of the method have been described in accordance with the above-described sequence; those skilled in the art would know that it is not necessary to carry out the above different steps in the above said sequence in order to achieve the effect of the present embodiment; in other words, these steps can be carried out simultaneously or in reversed sequence, and these simple variations fall within the scope of the protection of the present application.

Figure 3:
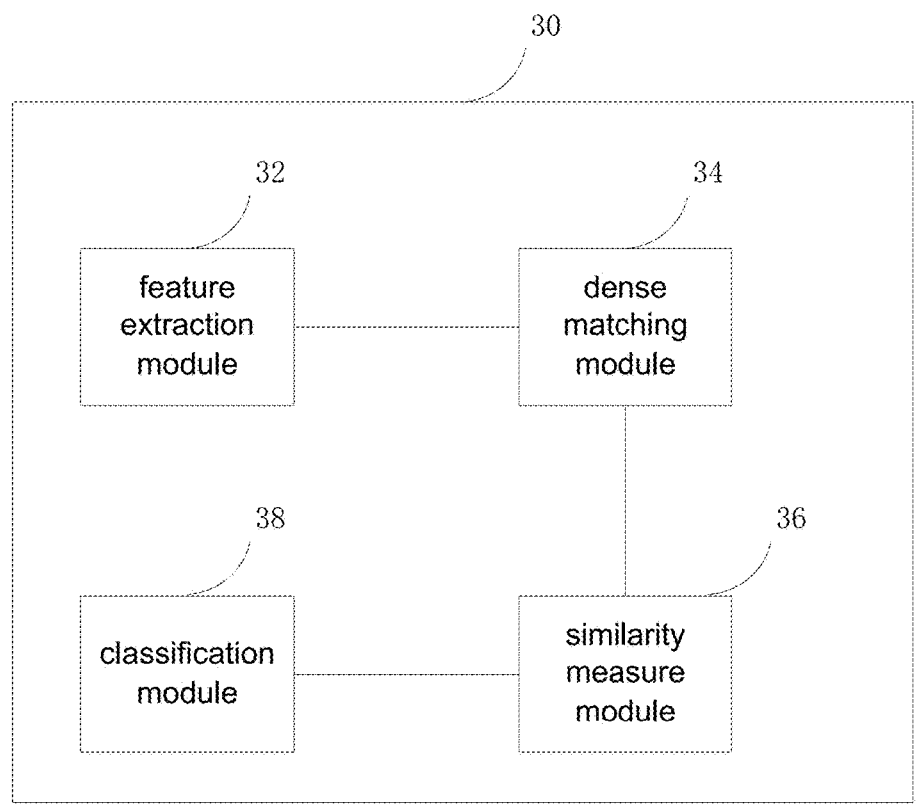
FIG. 3 is a structural diagram of an apparatus for recognizing RGB-D objects based on adaptive similarity measure of dense matching item in accordance with an exemplary embodiment.

An apparatus 30 for recognizing RGB-D objects based on adaptive similarity measure of dense matching item is also provided based on the same technical concept as that of the method embodiments. As shown in FIG. 3, the apparatus 30 can include at least: a feature extraction module 32, a dense matching module 34, a similarity measure module 36 and a classification module 38, wherein the feature extraction module 32 is used for extracting convolutional neural network features of the to-be-queried object and of the reference object; the dense matching module 34 is used to perform dense matching of the reference object and the to-be-queried object on the basis of the convolution neural network features in fusion with RGB and depth information; the similarity measure module 36 is used to measure the similarity between the reference object and the to-be-queried object according to the dense matching result; and the classification module 38 is used to classify the to-be-queried objects based on the similarity between the reference object and the to-be-queried object.

The above apparatus embodiments can be used to implement the above described method embodiments, their technical principles, solved technical problems and produced technical effect are similar, and those skilled in the art could learn it clearly. The detailed working process of the above apparatus could refer to the corresponding process of the preceding method embodiments and will not be repeated here for convenient and concise description.

It should be noted that: By the object identification, the apparatus for recognizing RGB-D objects based on adaptive similarity measure of dense matching item according to the above embodiments is only explained by taking the above described divided function modules as an example. However, in practical application, it is possible to accomplish the above functions by different function modules as required, that is, it is possible to divide the internal structure of the apparatus into different function modules to accomplish all or part of the above said functions.

The technical solutions provided by the embodiments of the present application have been described in detail.

Although this paper applies specific examples to illustrate the principles and embodiments of the present application, the above illustration of the above embodiments applies only to aid in understanding the principles of the embodiments of the present application; meanwhile those skilled in the art could make a variation within the scope of the embodiments and applications according to the present application.

It should be noted: reference signs in figures are only used to illustrate the present application more clearly and are not regarded as improper limitation to the protection scope of the application.

The terms "comprise", "include" or any other similar terms are intended to cover a non-exclusive inclusion, such that the process, the method, the article or the device/apparatus including a series of factors not only comprise those elements, but also comprise other factors that are not clearly listed, or further comprise those inherent factors of said process, method, article or device/apparatus. Regarding a factor defined by the statement "includes a . . . ", it is not excluded the situation that the process, the method, the article or the device/apparatus which includes the above said factor, further comprises other factors without more constraints, that is, the statement "includes a . . . " also has the meaning "includes a further . . . ".

All steps of this application can be implemented by means of universal computing device, for example, they may be integrated on one single computing device, such as personal computers, server computers, handheld or laptop devices, tablet-type device or multiple processors means, or they may be distributed over a network composed of a plurality of computing means. They can carry out the shown or described steps in a sequence that is different from the sequence described in this text, or they can be respectively configured as respective integrated circuit modules, or a plurality of modules or steps of them can be realized by being configured as single integrated circuit module. Accordingly, the present application is not limited to any specific hardware and software, or a combination thereof.

The method according to the present application can be implemented by using programmable logic devices; it can also be implemented as a computer program software or a program module (which includes routines, programs, objects, components, or data structures, etc. for performing particular tasks or implementing particular abstract data types). For example, the embodiment according to the present application can be a computer program product, which can be run to allow a computer to execute the described method. The computer program product includes a computer-readable storage medium on which the computer program logic or code portion for implementing the method is stored. The computer-readable storage medium may be built-in medium that is installed in the computer or may be a removable medium that is detachable from the computer body (for example, a hot-plug storage device). The built-in medium includes, but is not limited to the rewritable non-volatile memory, such as: RAM, ROM, flash memory and hard disk. The removable medium includes, but is not limited to: the optical storage medium (for example: CD-ROM and DVD), magneto-optical storage medium (for example: MO), magnetic storage medium (for example: a tape or removable hard disk), media having a built-in rewritable non-volatile memory (for example: a memory card) and the media having a built-in ROM (for example: ROM cartridge).

The present application is not limited to the above embodiments. Any variations, improvements or replacements that can be thought by those skilled in the art fall within the scope of the present application without departing from the substance contents of the present application.

Although basic novel features which are applicable to various embodiments of the present application have been shown, described and indicated in the above detailed description, it is to understand that those skilled in the art could make various omissions, substitutions and changes to the forms and details of the system without departing from the spirit of the application.

What is claimed is:

1. A method for recognizing RGB-D objects based on adaptive similarity measure of dense matching item, at least comprising:

extracting convolution neural network features of a to-be-queried object and a reference object;

carrying out dense matching of the reference object and the to-be-queried object on the basis of the convolution neural network features in fusion with RGB and depth information;

measuring similarity between the reference object and the to-be-queried object according to a result of the dense matching; and classifying the to-be-queried object based on the similarity between the reference object and the to-be-queried object, wherein the following formula is used for dense matching of the reference object and the to-be-queried object:

$$E(t_i) = \sum_i D_i(t_i) + \alpha \sum_i \|t_i\|_1 + \beta \sum_{i,j \in N} \min(\|t_i - t_j\|_1, \lambda); \text{ wherein } \sum_i D_i(t_i)$$

represents a data term;

$$\alpha \sum_i \|t_i\|_1$$

represents a displacement term;

$$\beta \sum_{i,j \in N} \min(\|t_i - t_j\|_1, \lambda)$$

represents a smoothing term; $t_i$ represents the amount of displacement of a pixel point found in the reference object corresponding to the i-th pixel point of the to-be-queried object; $t_j$ represents the amount of displacement of a pixel point found in the reference object corresponding to the j-th pixel point of the to-be-queried object; $D_i(t_i)$ represents a difference between the convolution neural network features of two matched pixel points; $\lambda$ represents a threshold value which defines a structure relationship of adjacent pixel points in the to-be-queried object; $\alpha$ and $\beta$ represent the weight coefficients among the data term, the displacement term, and the smoothing term.

2. Method according to claim 1, wherein the data terms specifically include:

$$D_i(t_i) = \theta \cdot [f_{rgb}(p_i \mid I_r) - f_{rgb}(p_i + t_i \mid I_q)] +$$

$$(1-\theta) \cdot [f_{depth}(p_i \mid I_r) - f_{depth}(p_i + t_i \mid I_q)];$$

wherein $f_{rgb}(p_i|I_q)$, $f_{rgb}(p_i|I_r)$ refer to the convolution neural network features at the i-th pixel point in the RGB images of the to-be-queried object and the reference object respectively; $f_{depth}(p_i|I_q)$, $f_{depth}(p_i|I_r)$ refer to extracted depth features; θ refers to a fusion coefficient of RGB and depth information.

3. Method according to claim 2, wherein said measuring the similarity between the reference object and the to-be-queried object includes: use the following formula to measure the similarity between the reference object and the to-be-queried object:

$$s_\theta(I_r|I_q) = \exp\left(-\gamma^{-1}\sum_i D_i(t_i)\right);$$

wherein γ represents a scale factor; $s_\theta(I_r|I_q)$ indicates a similarity score between the reference object and the to-be-queried object.

4. Method according to claim 3, wherein said use of the following formula to measure the similarity between the reference object and the to-be-queried object further includes:

$$s_{sum}(I_r|I_q) = \sum_\theta w_\theta \times s_\theta(I_r|I_q) + b = w^\bullet \Phi_{I_r|I_q};$$

wherein $s_\theta$ refers to the corresponding similarity score, $w_\theta$ refers to a weight coefficient, b refers to a deviation factor of the fusion; w refers to a weight vector of the fusion; and Φ refers to a score vector of the fusion.

5. Method according to claim 4, wherein said w is solved by ranking SVM algorithm and by using the following formula:

$$\min \tfrac{1}{2}\|w\|_2^2 + C\Sigma \xi_{i,i^+,i^-}$$

$$s.t. \forall(I_i,I_i^+,I_i^-)\in\Omega, \xi_{i,i^+,i^-}\geq 0,$$

$$w\Phi_{I_i^{-1}I_i^-} - w\Phi_{I_i^{-1}I_i^+} > 1 - \xi_{i,i^+,i^-}$$

$$\forall c(I_i)=c(I_i^+), c(I_i^-)\neq c(I_i),$$

wherein $\Omega=\{(I_i,I_i^+,I_i^-)\}_{i=1}^N$ represents a triple database; $I_i$ represents the to-be-queried object; $I_i^+$ denotes the reference object of the same category as the to-be-queried object; $I_i^-$ denotes the reference object of a different category from the to-be-queried object; ξ denotes a slack variable; C represents a penalty parameter.

6. Method according to claim 5, wherein said classifying the to-be-queried object includes: use the following formula to classify the to-be-queried object:

$$s_{vote}(I_t;c_i) = \frac{1}{K}\sum_{I_r\in c_i} s_{sum}(I_r|I_t),$$

wherein $I_t$ represents the to-be-queried object; $c_i$ represents categories of retrieved candidate classes; K represents the number of the reference object in the candidate class.

* * * * *